US010046498B2

(12) United States Patent
Dilworth et al.

(10) Patent No.: US 10,046,498 B2
(45) Date of Patent: Aug. 14, 2018

(54) HAND-HELD THREE-DIMENSIONAL DRAWING DEVICE

(71) Applicant: WobbleWorks, Inc., Wilmington, DE (US)

(72) Inventors: Peter Dilworth, Somerville, MA (US); Maxwell Bogue, Hong Kong (HK)

(73) Assignee: WOBBLEWORKS, INC., Wilmington, DE (US)

( * ) Notice: Subject to any disclaimer, the term of this patent is extended or adjusted under 35 U.S.C. 154(b) by 0 days.

(21) Appl. No.: 15/638,266

(22) Filed: Jun. 29, 2017

(65) Prior Publication Data
US 2017/0297245 A1    Oct. 19, 2017

Related U.S. Application Data

(63) Continuation of application No. 14/821,399, filed on Aug. 7, 2015, now Pat. No. 9,731,444, which is a
(Continued)

(51) Int. Cl.
*B29C 47/00* (2006.01)
*B29C 47/08* (2006.01)
(Continued)

(52) U.S. Cl.
CPC ...... *B29C 47/0002* (2013.01); *B29C 47/0014* (2013.01); *B29C 47/0805* (2013.01);
(Continued)

(58) Field of Classification Search
CPC ............ B29C 47/0002; B29C 47/0014; B29C 47/0805; B29C 47/0806; B29C 47/364;
(Continued)

(56) References Cited

U.S. PATENT DOCUMENTS 3,281,576 A   10/1966   Cooper et al.
3,559,241 A    2/1971   Chu
(Continued)

FOREIGN PATENT DOCUMENTS

CN   1285856 A   2/2001
CN   2761402 Y   3/2006
(Continued)

OTHER PUBLICATIONS

"A Range of Leister Hand-Held and Automatic Welders from Techspan," Dec. 12, 2006, retrieved from http://www.ferret.com.au/c/techspan-group/a-range-of-Leister-hand-held-automatic-welders-from-Techspan-n667443.
Donutman.sub.—2000 "Plastic Welding Gun (Plastruder MK4)" published Sep. 19, 2010, http://www.thingiverse.com/thing:4156, last accessed Jul. 3, 2014.

*Primary Examiner* — Joseph S Del Sole
*Assistant Examiner* — Lawrence D. Hohenbrink, Jr.
(74) *Attorney, Agent, or Firm* — Nathan S. Smith; McDermott Will & Emery LLP

(57) ABSTRACT

A three-dimensional drawing device can include a housing configured for to be held in user's hand, shaped to allow manipulation of the housing like a pen, and configured to accept a strand of thermoplastic material. The drawing device has a nozzle assembly with an exit nozzle and a motor connected to a gear train that engages the strand such that rotation of the motor causes the feed stock to be extruded out of the exit nozzle to form a three-dimensional object. The motor can be controlled using a variable speed control mechanism or first and second actuators, thereby controlling movement of the strand, for example, to advance or retract the strand relative to the nozzle assembly.

19 Claims, 4 Drawing Sheets

Related U.S. Application Data continuation of application No. 13/831,050, filed on Mar. 14, 2013, now Pat. No. 9,102,098.

(60) Provisional application No. 61/733,689, filed on Dec. 5, 2012.

(51) Int. Cl.

| | | |
|---|---|---|
| *B33Y 10/00* | (2015.01) | |
| *B33Y 30/00* | (2015.01) | |
| *B29C 47/86* | (2006.01) | |
| *B29C 64/106* | (2017.01) | |
| *B29C 47/36* | (2006.01) | |
| *B29C 67/00* | (2017.01) | |
| B05C 17/005 | (2006.01) | |
| B29C 47/80 | (2006.01) | |
| B29C 47/92 | (2006.01) | |
| B29C 64/10 | (2017.01) | |

(52) U.S. Cl.
CPC ........ *B29C 47/0806* (2013.01); *B29C 47/364* (2013.01); *B29C 47/864* (2013.01); *B29C 64/106* (2017.08); *B29C 67/0055* (2013.01); *B29C 67/0085* (2013.01); *B33Y 10/00* (2014.12); *B33Y 30/00* (2014.12); *B05C 17/0053* (2013.01); *B29C 47/802* (2013.01); *B29C 47/862* (2013.01); *B29C 47/92* (2013.01); *B29C 64/10* (2017.08); *B29C 67/0051* (2013.01); *B29C 2947/9258* (2013.01); *B29C 2947/92704* (2013.01)

(58) Field of Classification Search
CPC ... B29C 47/864; B29C 47/802; B29C 47/862; B29C 47/92; B29C 64/106; B29C 64/10; B29C 67/0055; B29C 67/0085; B29C 67/0051; B29C 2947/9258; B29C 2947/92704; B33Y 10/00; B33Y 30/00; B05C 17/0053
USPC .................................. 425/375, 87; 264/308
See application file for complete search history.

(56) References Cited

U.S. PATENT DOCUMENTS

| | | |
|---|---|---|
| 3,604,597 A | 9/1971 | Pohl et al. |
| 3,665,158 A | 5/1972 | Froedge |
| 3,887,319 A | 6/1975 | Cottingham |
| 4,059,204 A | 11/1977 | Duncan et al. |
| 4,552,287 A | 11/1985 | Dziki |
| 4,597,821 A | 7/1986 | Munro |
| 4,681,524 A | 7/1987 | Ikeda et al. |
| 5,121,329 A | 6/1992 | Crump |
| 5,169,587 A | 12/1992 | Courval |
| 5,340,433 A | 8/1994 | Crump |
| 5,672,312 A | 9/1997 | Almquist et al. |
| 5,843,490 A | 12/1998 | Horiba et al. |
| 5,853,774 A | 12/1998 | Dreve |
| 6,117,385 A | 9/2000 | Chartoff et al. |
| 6,129,872 A | 10/2000 | Jang |
| 6,162,378 A | 12/2000 | Bedal et al. |
| 6,238,613 B1 | 5/2001 | Batchelder et al. |
| 6,460,481 B1 * | 10/2002 | Young ..................... A23G 3/28 118/14 |
| 6,500,374 B1 | 12/2002 | Akioka et al. |
| 6,558,059 B1 | 5/2003 | Hillinger et al. |
| 6,776,602 B2 * | 8/2004 | Swanson ................ B29C 64/40 206/204 |
| 7,959,847 B2 | 6/2011 | Wicker et al. |
| 8,221,669 B2 | 7/2012 | Batchelder et al. |
| 8,236,227 B2 | 8/2012 | Batchelder et al. |
| 8,262,304 B2 | 9/2012 | Llach et al. |
| 8,439,665 B2 | 5/2013 | Batchelder et al. |
| 8,926,882 B2 | 1/2015 | Batchelder et al. |
| 9,102,098 B2 | 8/2015 | Dilworth et al. |
| 2001/0030383 A1 | 10/2001 | Swanson et al. |
| 2001/0033037 A1 | 10/2001 | Nitschke et al. |
| 2003/0137077 A1 | 7/2003 | Lee et al. |
| 2004/0232165 A1 | 11/2004 | Lee |
| 2005/0129941 A1 | 6/2005 | Comb et al. |
| 2005/0288813 A1 | 12/2005 | Yang et al. |
| 2006/0051442 A1 | 3/2006 | Miceli et al. |
| 2006/0198918 A1 | 9/2006 | Koyagi et al. |
| 2007/0003656 A1 | 1/2007 | LaBossiere et al. |
| 2007/0029693 A1 | 2/2007 | Wigand et al. |
| 2007/0228590 A1 | 10/2007 | LaBossiere et al. |
| 2008/0197116 A1 | 8/2008 | Achtner et al. |
| 2008/0213419 A1 | 9/2008 | Skubic et al. |
| 2009/0133800 A1 | 5/2009 | Morohoshi et al. |
| 2009/0274540 A1 | 11/2009 | Batchelder et al. |
| 2009/0283544 A1 | 11/2009 | Salmela et al. |
| 2010/0147465 A1* | 6/2010 | Di Miceli ........... B29C 47/0002 156/579 |
| 2010/0166969 A1* | 7/2010 | Batchelder ............ B29C 64/106 427/402 |
| 2010/0327479 A1 | 12/2010 | Zinniel et al. |
| 2011/0074065 A1 | 3/2011 | Batchelder et al. |
| 2011/0076496 A1 | 3/2011 | Batchelder et al. |
| 2011/0079936 A1 | 4/2011 | Oxman |
| 2011/0196660 A1 | 8/2011 | Liu et al. |
| 2012/0070523 A1 | 3/2012 | Swanson et al. |
| 2012/0219699 A1 | 8/2012 | Pettersson et al. |
| 2012/0258190 A1 | 10/2012 | Batchelder et al. |
| 2013/0209600 A1 | 8/2013 | Tow |
| 2013/0234366 A1 | 9/2013 | Batchelder et al. |
| 2014/0044823 A1 | 2/2014 | Pax et al. |
| 2014/0120197 A1 | 5/2014 | Swanson et al. |
| 2014/0159273 A1 | 6/2014 | Koop et al. |
| 2014/0291886 A1 | 10/2014 | Mark et al. |
| 2014/0328963 A1 | 11/2014 | Mark et al. |
| 2015/0096717 A1 | 4/2015 | Batchelder et al. |
| 2015/0137402 A1 | 5/2015 | Schmehl et al. |
| 2015/0147427 A1 | 5/2015 | Lundwall et al. |
| 2015/0165691 A1 | 6/2015 | Mark et al. |
| 2015/0331412 A1 | 11/2015 | Adair et al. |
| 2016/0031159 A1 | 2/2016 | Church et al. |
| 2017/0057168 A1 | 3/2017 | Miller et al. |
| 2017/0120519 A1 | 5/2017 | Mark |
| 2017/0157826 A1 | 6/2017 | Hishiki |

FOREIGN PATENT DOCUMENTS

| | | |
|---|---|---|
| CN | 2813176 Y | 9/2006 |
| CN | 101166597 A | 4/2008 |
| CN | 101172428 A | 5/2008 |
| CN | 201086388 Y | 7/2008 |
| CN | 202079738 U | 12/2011 |
| CN | 202399493 U | 8/2012 |
| CN | 102922721 A | 2/2013 |
| CN | 203371791 U | 1/2014 |
| CN | 203449607 U | 2/2014 |
| CN | 103707511 A | 4/2014 |
| CN | 203592687 U | 5/2014 |
| DE | 3341201 A1 | 5/1985 |
| EP | 0257838 A2 | 3/1988 |
| JP | S61-141959 A | 6/1986 |
| JP | S63-205216 A | 8/1988 |
| WO | WO-99/32544 A1 | 7/1999 |
| WO | WO-2009/134298 A2 | 11/2009 |
| WO | WO-2012/088257 A1 | 6/2012 |
| WO | WO-2012/152510 A1 | 11/2012 |
| WO | WO-2012/152511 A1 | 11/2012 |
| WO | WO-2015/020944 A1 | 2/2015 |

* cited by examiner

HAND-HELD THREE-DIMENSIONAL DRAWING DEVICE

CROSS-REFERENCE TO RELATED APPLICATIONS

The present application is a continuation of U.S. application Ser. No. 14/821,399, filed Aug. 7, 2015, which is a continuation of U.S. application Ser. No. 13/831,050, filed Mar. 14, 2013, now U.S. Pat. No. 9,102,098, which claims benefit of and priority to U.S. Provisional Patent Application Ser. No. 61/733,689, filed on Dec. 5, 2012, the entirety of each of which is hereby incorporated herein by reference.

BACKGROUND

Field

The present disclosure relates to extrusion devices and, in particular, a hand-held implement configured to extrude a material so as to construct three-dimensional (3D) objects.

Description of the Related Art

Three-dimensional printers are known which may be used to produce 3D items of all types. Certain printers operate by deposition of sequential layers of plastic while others function by sequential agglomeration or solidification of layers of a precursor material. These printers tend to be large and expensive and require the design to be provided as a computer file, for example as generated by a Computer-Aided Design (CAD) program.

U.S. Pat. No. 3,665,158 to Froedge discloses a conventional handheld extrusion device. A chamber is filled with a granulated solid plastic material and then sealed with a cap. The contents of the chamber are heated to melt the plastic and create pressure within the chamber. A passage leads from the chamber to a rotatable nozzle that blocks flow in a first position and allows flow in a second position. A trigger is attached to the nozzle such that pulling the trigger moves the nozzle to the second position, thereby allowing the molten plastic to be expelled from the nozzle due to the pressure within the chamber. Releasing the trigger allows the nozzle to return to the first position, thereby stopping the flow of plastic. There is no provision to replenish the raw material without shutting off the device nor any mechanism to mechanically feed material to the nozzle at a constant rate. In addition, Froedge's system does not provide a means of cooling the extruded material.

SUMMARY

It is desirable to provide a reliable, easily refillable hand-held device to form 2D and 3D items without the need for computerized design files. The present disclosure describes a hand-held device that allows a user to "draw" a 3D structure with a feed stock that can be replenished while in continuous use.

In certain embodiments, a 3D drawing device is disclosed that includes a housing configured for manipulation by a user's hand and to accept a feed stock, a nozzle assembly at least partially disposed within the housing and having an exit nozzle, a motor disposed within the housing, and a gear train disposed within the housing and coupled between the motor and the feed stock and configured such that rotation of the motor causes the feed stock to be extruded out of the exit nozzle to form a three-dimensional object.

In certain embodiments, a 3D drawing device is disclosed that includes a housing configured for manipulation by a user's hand and to accept a feed stock. The housing has an internal volume and at least one cooling port in fluid communication with the internal volume. The 3D drawing device also includes a nozzle assembly at least partially disposed within the housing proximate to the at least one cooling port and having an exit nozzle, a fan disposed within the housing and configured to draw air into the internal volume and then force the air out of the at least one cooling port, a motor disposed within the housing, and an actuator coupled to the housing. Actuation of the actuator causes the feed stock to be extruded out of the exit nozzle to form a three-dimensional object.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present disclosure describes a hand-held device that allows a user to "draw" a 2D or 3D structure and to easily refill or replace the feed stock.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

As used within this disclosure, the phrase "feed stock" means any material provided in any form suitable for processing within the 3D drawing device so as to provide the desired output stream. Feed stock may be a thermoplastic such as acrylonitrile butadiene styrene (ABS), polyvinyl chloride (PVC) or a polylactic acid (PLA), a thermoset material such as an epoxy, a metal such as tin or lead or a mixture of metals. Feed stock may be a single material or a mixture of materials, such as a rod having particles of a first material dispersed within a matrix of a second material.

Figure 1:
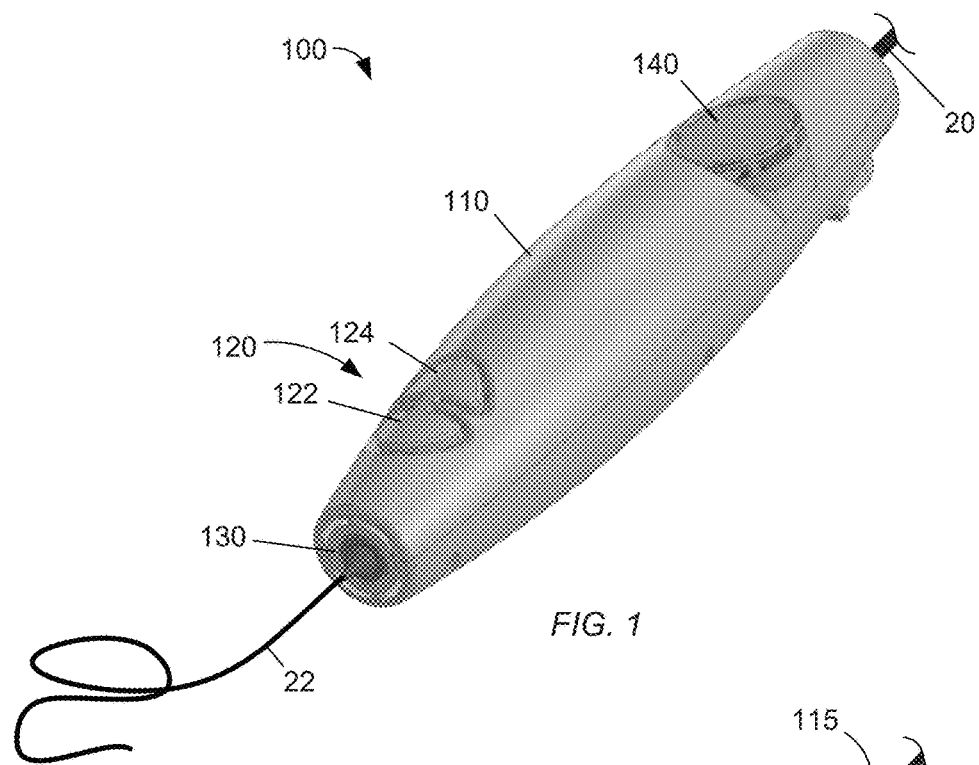
FIG. 1 is a perspective view of an exemplary 3D drawing device according to certain aspects of the present disclosure.

FIG. 1 is a perspective view of an exemplary 3D drawing device 100 according to certain aspects of the present disclosure. The device 100 includes a housing 110 in which a control assembly 120, a nozzle assembly 130, a fan assembly 140 are provided. The housing 110 may be sized and configured to fit in a user's hand and suitably shaped to allow for manipulation like a pen or pencil. An actuator, for example buttons 122 and 124 in this embodiment, may be positioned to allow the user to actuate either the actuator while holding the device 100. In this embodiment, the user may actuate one or both of buttons 122, 124 while manipulating the 3D drawing device 100. In this embodiment, the device 100 is configured to accept a feed stock 20 in the form of a strand that may be 3 mm in diameter. In certain embodiments, the feed stock 20 may be provided as a cut length, for example 30 cm in length, or as a continuous strand drawn from a spool (not shown in FIG. 1). includes an input portal 18, or other input element, such as a hopper, for example, through which a raw material 19 is provided to the implement 10. The feed stock 20 may be a thermoplastic material, for example a PVC, an ABS, or a PLA, however, other embodiments may accept other types of material, such as a thermoset plastic or a metal or combination of materials.

In an example of use of one embodiment of the device 100, the user selects a particular type and color of a thermoplastic feed stock 20 and introduces the feed stock 20 into the entrance port 115 (see FIG. 2) and connects a power cord (not shown in FIG. 1) to a power source, such as a wall outlet. In certain embodiments, the 3D drawing device 100 may include a portable power source (not shown in FIGS. 1-2), for example a lithium polymer battery, to power the device 100. After a warm-up period, the user may press button 122 while drawing a line on a surface with the device 100, for example tracing a pattern on a printed sheet, in a manner similar to drawing a line with a pencil. A column 22 of the feed stock 20 is extruded from the nozzle assembly while the button 122 is depressed. In certain embodiments, the column 22 may be 0.3 mm in diameter. If the user moves the device along the surface at approximately the same speed as the rate of extrusion of the column 22, the user will create a solid, three-dimensional "line" on the surface. In certain embodiments, the feed stock 20 exists the nozzle assembly 130 in essentially a solid form such that the extruded column retains its shape. In certain embodiments, freshly extruded feed stock 20 will bond to previously extruded columns 22 such that a structure may be formed by drawing a line across to onto a previously drawn column 22.

In certain embodiments, button 122 may cause the feed stock 20 to be extruded at a first rate, for example 2.6 mm/sec, while the second button 124 may cause the feed stock 20 to be extruded at a second rate, for example 5.0 mm/sec. In certain embodiments, the first rate may be in the range of 0.1-10.0 mm/sec and the second rate may be in the range of 2-50 mm/sec. In certain embodiments, the first and second rates are chosen to provide a speed appropriate for the intended user, for example a device 100 intended for use by a young child may have slower rates than a device 100 intended for an adult artist. In certain embodiments, the 3D drawing device 100 may include a variable speed control mechanism (not shown in FIG. 1-2) to allow the user to adjust one or more of the rates of extrusion. In certain embodiments, the variable speed control mechanism may include a dial. In certain embodiments, releasing either of the buttons 122, 124 may cause the internal mechanism to draw the feed stock 20 backward a certain amount, thereby breaking off the extruded column 22. In this manner, the user can "write" with the 3D drawing device 100 in much the same manner as they would with a pen except they can do so in three dimensions since the extruded material is three-dimensional. The user can create free-form lines, shapes or other objects, as desired. A user may additionally use stencils or other guides in order to create desired objects such as sculpture, jewelry, artistic pieces, etc. In addition, or in the alternative, the 3D drawing device 100 may be used to repair or enhance existing objects and structures. In certain embodiments, pressing both buttons 122, 124 at the same time may cause another action, such as expelling the unused portion of the feed stock 20 from the entrance port 115 such that the user may switch to a different color or type of feed stock 20.

Figure 2:
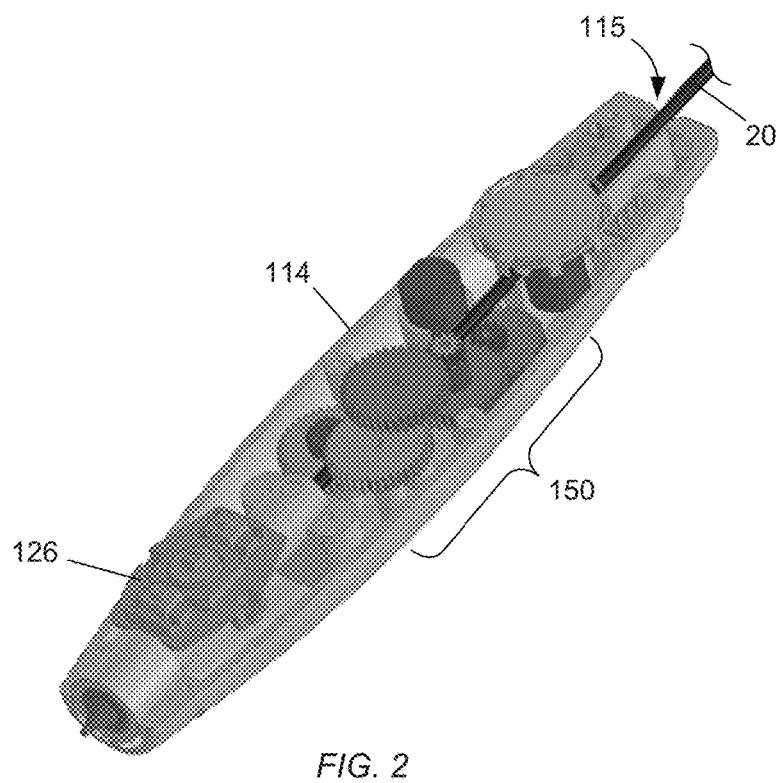
FIG. 2 is a cut-way view of the device of FIG. 1 with a portion of the housing removed according to certain aspects of the present disclosure.

FIG. 2 is a cut-way view of the device 100 of FIG. 1 with a portion of the housing 110 removed according to certain aspects of the present disclosure. It can be seen that a circuit assembly 126 is positioned under the switches 122, 124 and a feed mechanism 150 is disposed on the lower housing 114, with the feed stock 20 entering through the entrance port 115 and passing over and between elements of the feed mechanism 150, which is discussed in greater detail with respect to FIGS. 4A-4B. In certain embodiments, the circuit assembly 126 may include a processor while, in certain embodiments, the circuit assembly 126 may include analog circuit elements such as mechanical switches, resistors, capacitors, and other electrical elements (not visible in FIG. 2) as known to those of skill in the art. In certain embodiments, the circuit assembly 126 may include a power conditioning circuit (not shown) that converts power from the power source to a different form, such as a direct current (DC) voltage. In certain embodiments, the circuit assembly 126 may include a portable power source (not shown in FIG. 2). In certain embodiments, the circuit assembly 126 may be connected to an external power source through a power cord (not shown in FIGS. 1-2). In certain embodiments, the 3D drawing device 100 also includes an external control interface 127 that is connected to the circuit assembly 126 and configured to accept actuation commands from a remote system, such as a computer numerical control (CNC) machine. In certain embodiments, the housing 110 may be adapted for mounting on a tool interface of a CNC machine such that the machine can manipulate the 3D drawing device 100 to create 3D objects. For example, the external control interface 127 may include three electrical pins, wherein a pin 1 is a common such as a ground, a pin 2 that is coupled to the button 122 such that provision of a DC voltage across pin 1 and pin 2 is equivalent to pressing button 122, and a pin 3 that is coupled to the button 124 such that provision of a DC voltage across pin 1 and pin 3 is equivalent to pressing button 124. In certain embodiments, the external control interface 127 may be configured to accept signals through a radio frequency (RF) or optical wireless system. In certain embodiments, the external control interface 127 may be configured to accept signals through a fiber-optic cable.

Figure 3A:
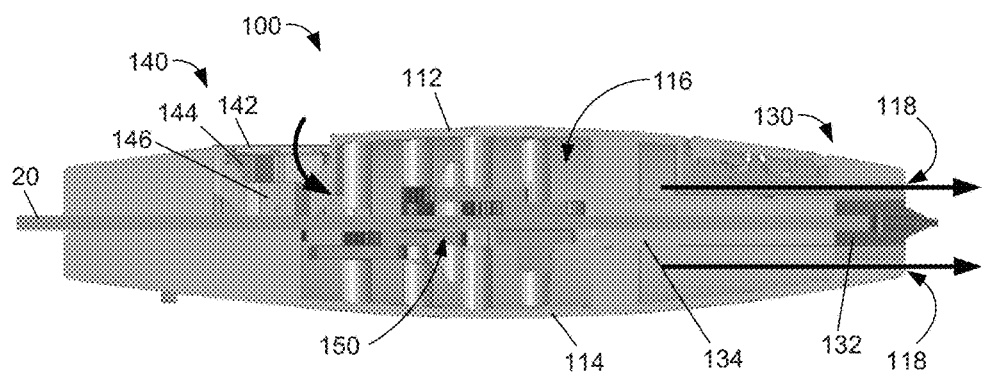
FIGS. 3A-3B are cross-sectional and cutaway views of the device of FIG. 1 according to certain aspects of the present disclosure.
Figure 3B:
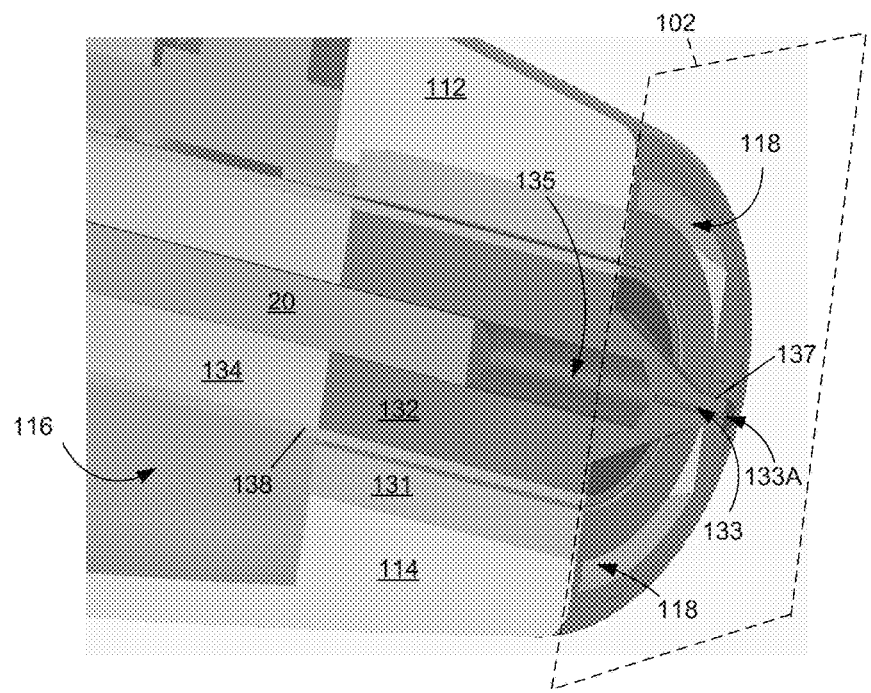

FIGS. 3A-3B are cross-sectional and cutaway views of the device 100 of FIG. 1 according to certain aspects of the present disclosure. FIG. 3A is a side view of the entire 3D drawing device 100, showing how the upper housing 112 and lower housing 114 together form an internal volume 116 in which is located the feed mechanism 150. At the right end, it can be seen that the nozzle assembly 130 includes an extruder 132 and a guide tube 134, which are discussed in greater detail with respect to FIG. 3B. the fan assembly 140 includes a fan cover 142, which is stationary and attached to the upper housing 112, an impeller 14 located underneath the cover 142 and configured to draw air into the internal volume 116 through ports (not visible in FIG. 3A) in the cover 142. A motor 146 is mounted, in this example, to the lower housing 114 and drives the impeller 144 at a constant speed. The air that is drawn into the internal volume may, in certain embodiments, flow out through either cooling ports 118 in the upper and lower housings 112, 114. The cooling ports 118 are discussed in greater detail with respect to FIG. 3B. It can be seen in FIG. 3A that, in this embodiment, the feed stock 20 follows a straight path though the device 100.

FIG. 3B is a close-up, cutaway view of the nozzle assembly 130. The extruder 132 has a first chamber 135 formed as a cylindrical bore of approximately the same diameter as the feed stock 20 and an extrusion passage 133 of a smaller diameter, terminating in an exit nozzle 133A. In certain embodiments, the first chamber 135 may have a first diameter of 3 mm while the extrusion passage 133 has a diameter of 0.3 mm. In certain embodiments, the extruder 132 is formed of a thermally conductive material, for example a metal or a ceramic, with a heating element, for example a nichrome wire, (not visible in FIG. 3B) wound around the exterior circumference. When the device 100 is connected to a power source, the heating element raises the temperature of the extruder 132 to a temperature that may be above the melting point of the feed stock 20. In certain embodiments, the nozzle assembly 130 includes a temperature sensor that is connected to the circuit assembly 126 which may include a temperature control circuit to regulate the power to the heater element so as to maintain the temperature of the extruder 132 within a desired range of a setpoint. As systems and methods for temperature regulation are known to those of skill in the art, the details are not provided herein. In certain embodiments, an indicator (not shown), for example an LED, may be provided to indicate that the extruder 132 has reached a temperature sufficient to melt the feed stock 20.

In certain embodiments, for example with a feed stock comprising a plastic, the temperature of the extruder 132 may be in the range of 20-500° C. In certain embodiments, for example with a feed stock comprising a metal, the temperature of the extruder 132 may be in the range of 1000-2000° C. In certain embodiments, for example with a feed stock comprising a metal such as lead, tin, or mixtures thereof, the temperature of the extruder 132 may be in the range of 100-400° C. In certain embodiments, for example with a feed stock comprising a metal such as copper, gold, silver or mixtures thereof, the temperature of the extruder 132 may be in the range of 1000-1200° C. In certain embodiments, for example with a feed stock comprising a metal such as platinum, the temperature of the extruder 132 may be in the range of 1600-2000° C. In certain embodiments, the 3D drawing device 100 may include a variable temperature controller (not shown) that is connected to the circuit assembly 126 to allow a user to select a setpoint temperature for the extruder 132. In certain embodiments, the variable temperature controller may allow the use to select a type of material, for example "thermoplastic," and the circuit assembly 126 will adjust the setpoint temperature of the extruder 132. In certain embodiments, the variable temperature controller may include a dial.

A guide tube 134 is aligned with the first chamber 135 of the extruder 132 such that feed stock passing through the guide tube 134 enters the first chamber 135. In certain embodiments, the guide tube 134 may be formed of a low-friction material, such as polytetrafluoroethylene (PTFE), so allow the feed stock 20 to slide easily while also minimizing the gap between the guide tube 134 and feed stock 20. The extruder 132 and guide tube 134 are held in alignment by a mounting tube 138. In certain embodiments, the mounting tube 138 is formed of a metal having a relatively low thermal conductivity, compared to other metals. In certain embodiments, the mounting tube 138 may be a stainless steel. In certain embodiments, an insulating film (not visible in FIG. 3B), for example a polyimide tape, may be applied over the heating element and under the mounting tube 138.

In certain embodiments, an insulator 131 may be provided over the mounting tube 138 so as to reduce the amount of heat transferred from the extruder 132 to the upper and lower housings 112, 114. In certain embodiments, one or both of the upper and lower housings 112, 114 may have cooling ports 118 formed therethrough such that air can flow from the interior volume 116 to the ambient atmosphere. In certain embodiments, the passages formed in the top and bottom housings 112, 114 that lead to the cooling ports 118 may be angled such that the air that emerges from the cooling ports 118 is directed inward toward the tip 137. Thus, as the air exits the cooling ports 118, the air passes by the tip 137 of the extruder 132, cooling both the tip 137 and the feed stock 20 that just been extruded from the extrusion passage 133. Both of these cooling effects serve to reduce the temperature of the feed stock 20 as it exits the extrusion passage 133 such that the feed stock 20 may be essentially solid as it exits the extrusion passage 133. In certain embodiments, the freshly extruded feed stock 20 may be pliable and formable into various shapes. In certain embodiments, the surface of the freshly extruded feed stock 20 may be receptive to attachment, e.g. sticky, such that the extruded material will bond to other previously extruded feed stock 20.

In certain embodiments, there may be a gap between the insulator 131 and the mounting tube 138. In certain embodiments, this gap may provide a thermal break so as to further thermally isolate the upper and lower housings 112, 114 from the extruder 132.

As the feed stock 20 is driven toward the extrusion passage 133 by the feed mechanism 150 (not shown in FIG. 3B), the portion of the feed stock 20 that is within the extruder 132 will be heated by the extruder 132 such that the feed stock 20 within the first chamber 135 softens or melts. As the solid feed stock 20 is forced forward, the softened or molten feed stock 20 will be forced out through the extrusion passage 133 and emerge from the tip 137, where the cooling air that is flowing out of the cooling ports 118 flows over the freshly extruded feed stock 20, thereby cooling and solidifying the feed stock 20. In certain embodiments, a portion of the extruder 132 that extends outward beyond a front plane 102 may be cooled to a temperature below the temperature of the main portion of the extruder 132 by the air flowing out of the cooling ports 118. In certain embodiments, the temperature of the tip 137 may be below the melting point of the feed stock 20.

Figure 4A:
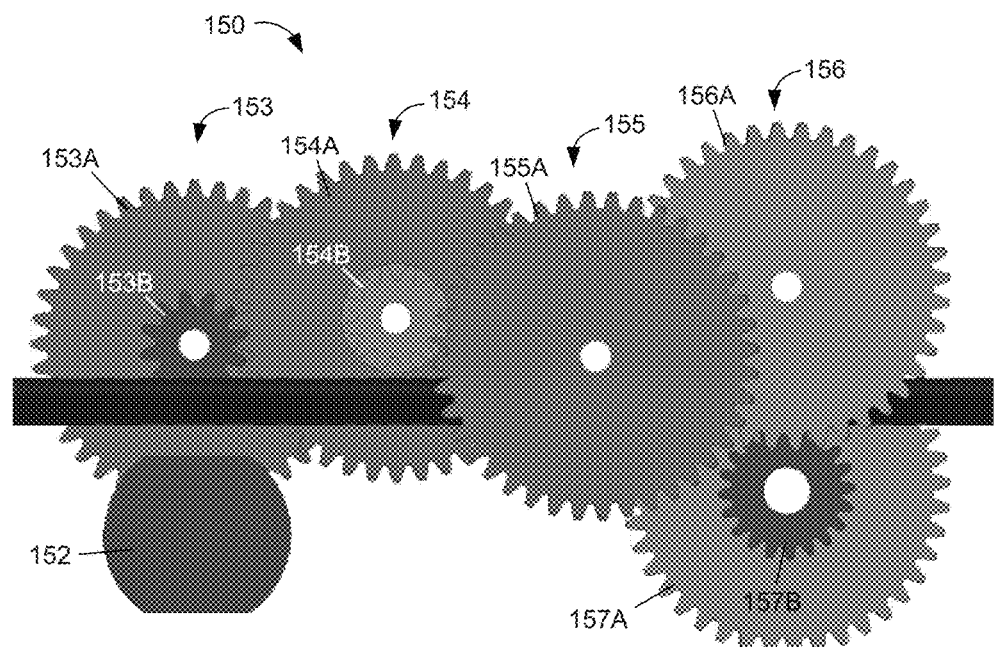
FIGS. 4A-4B are plan and perspective views of the feed mechanism according to certain aspects of the present disclosure.
Figure 4B:
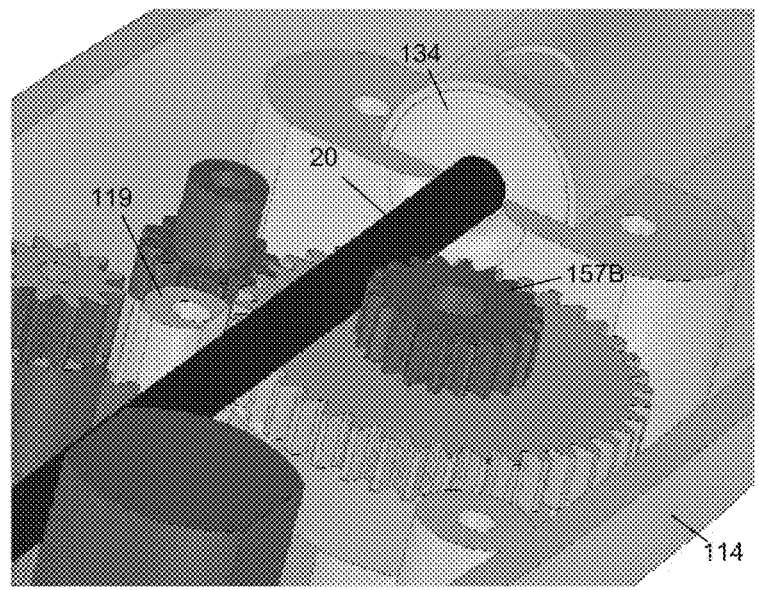

FIGS. 4A-4B are plan and perspective views of the feed mechanism 150 according to certain aspects of the present disclosure. FIG. 4A shows a series of gear pairs 153, 154, 155, 156, and 157 that are driven by the motor 152 through a spur gear (not visible in FIG. 4A) that is attached to the rotor of the motor 152. Each gear pair has a large gear and a small gear that are fixedly attached to each other and rotate about a common axis. The small gear of the motor 152 drives the large gear 153A, which causes the small gear 153B to drive the large gear 154A. In certain embodiments, the large gears 153A, 154A, 155A, 156A, and 157A each may have 40 teeth while the small gears 153B, 154B, 155B and 156B (not visible in FIG. 4A), and 157B may have 12 teeth, providing a 40:12 step-down ratio between each gear pair. In certain embodiments, the step-down from the motor 152 to the small gear 157B may be 5*(40:12) or approximately 17:1, i.e. seventeen complete rotations of the motor 152 causes only one complete rotation of the small gear 157B. In certain embodiments, the gear pairs 153, 154, 155, 156, and 157 may have a different number of teeth on the large and/or small gears. In certain embodiments, the gear pairs 153, 154, 155, 156, and 157 may not have the same number of teeth on each corresponding large or small gear.

In use, the use of a motor 152 to drive a step-down gear train 150 to control the advancement of the feed stock 20 provides an improved level of control over the rate of extrusion of the feed stock 20. For example, a conventional glue gun has a direct linkage between a trigger and the glue stick, such that pressure on the trigger on the trigger is directly transferred to the rod. The rate of advancement of the glue stick, and therefore the rate of extrusion, is dependent upon the viscosity of the melted glue and therefore caries over a die range. This often results in excessive glue being dispensed. In addition, since releasing the trigger does not retract the glue stick, there is frequently a "tail" of glue drawn out of the glue gun as the nozzle is moved away from the dispensing location. In contrast, the disclosed 3D drawing device 100 provides a constant rate of extrusion, for example 3 mm/sec, due to the controlled motion provided by the motor 152 and gear train 150. In addition, the circuit assembly 126 causes the motor 152 to briefly run in reverse when the button 122 is released, thereby retracting the feed stock 20 slightly and drawing the melted feed stock 20 that is within the extrusion passage 133 back into the extruder 132, thereby cleanly severing the extruded column 22 from the tip 137.

FIG. 4B shows how the teeth of the final small gear 157B engage the feed stock 20. In this embodiment, the feed stock 20 passes by a post 119 of the lower housing 114, then by the small gear 157B, and then into the guide tube 134. In certain embodiments, the gear 157B is positioned such that the teeth press against the feed stock 20, which is restrained from lateral motion away from the teeth of gear 157B by the post 119 and the guide tube 134, such that rotation of the gear 157B applies an axial force, i.e. directed along the length, to the feed stock 20. Rotation of the gear set 150 in a first direction will cause the feed stock 20 to move linearly forward, i.e. toward the tip 137. As this portion of feed stock 20 is not affected by the heating within the extruder 132, rotation of the gear set 150 in a reverse direction will cause the feed stock 20 to move linearly backward, i.e. away from the tip 137.

It can be seen from FIGS. 4A and 4B that rotation of the motor 152, which is controlled by pressing one of the buttons 122, 124, causes the feed stock 20 to move forward or backward. The step-down from the motor 152 to the small gear 157B provides a smooth rate of motion of the feed stock, as the motor 152 may turn at a speed within a normal range of smooth operation while the step-down converts this to a low rate of linear motion of the feed stock 20.

Figure 5A:
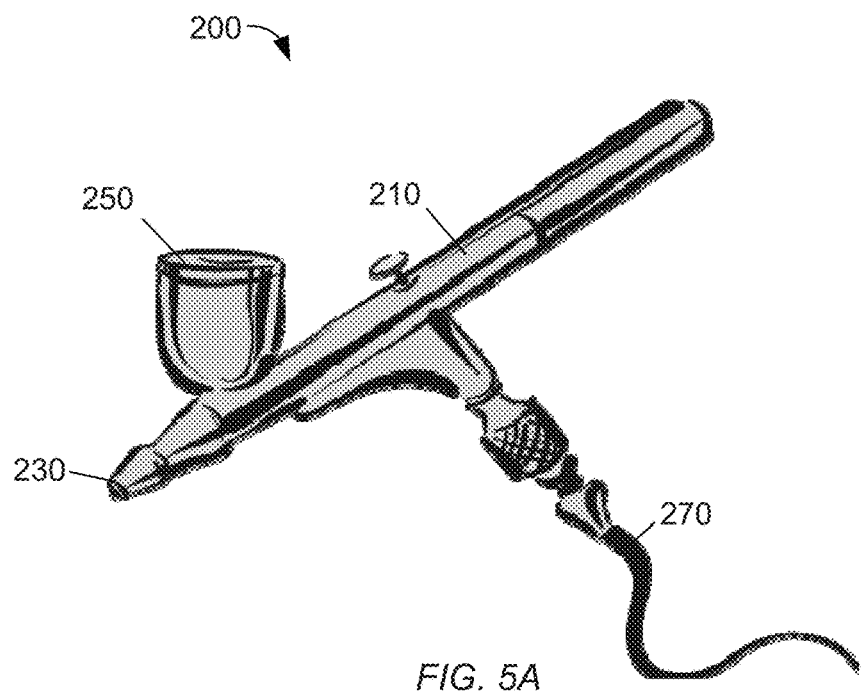
FIGS. 5A-5B are perspective and cutaway views of another embodiment of a 3D drawing device according to certain aspects of the present disclosure.
Figure 5B:
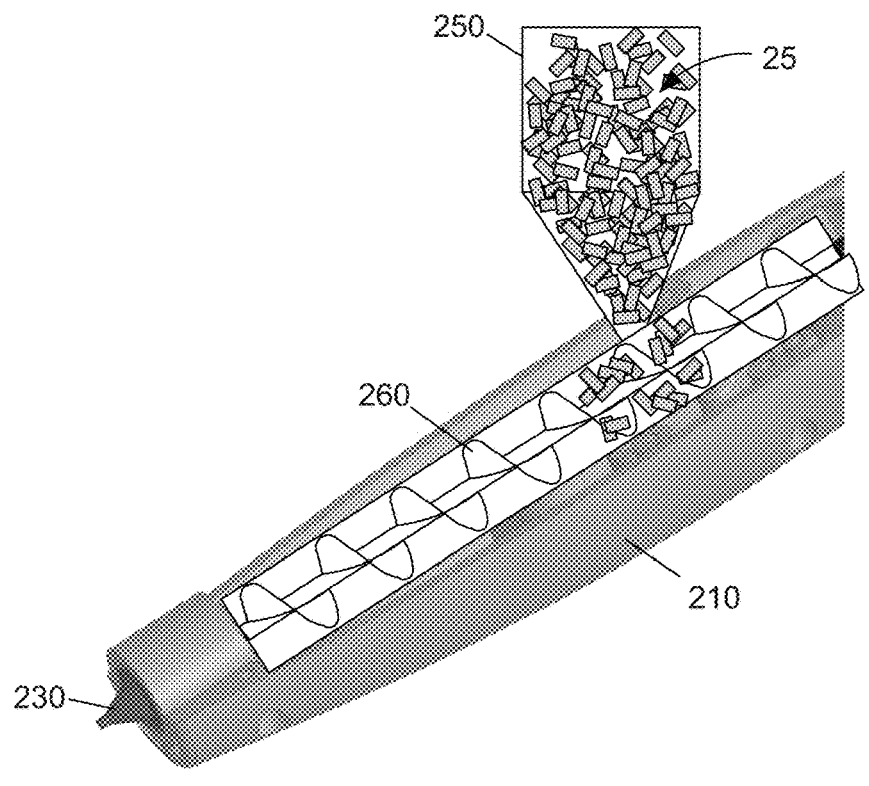

FIGS. 5A-5B are perspective and cutaway views of another embodiment 200 of a 3D drawing device according to certain aspects of the present disclosure. FIG. 5A shows a 3D drawing device 200 configured to accept a feed stock in the form of pellets 25 that are held in a hopper 250 attached to the body 210. A power cord 270 is attached to the body 210. FIG. 5B is a cut-away view showing a feed screw 260 that transfers the pellets 25 from the hopper 250 to the nozzle assembly 230 that melts the pellets 25 and, under pressure provided by the feed screw 260, extrudes the melted feed stock 25 in a manner similar to the nozzle assembly 130 of embodiment 100, previously discussed. Other features of the embodiment 100, such as the cooling ports 118, may also be provided in embodiment 200. In certain embodiments, the pellets may be transferred from the hopper 250 to the nozzle assembly 130 by other mechanisms, for example a reciprocating cylinder (not shown in FIGS. 5A-5B) as will be known to those of skill in the art. In certain embodiments, the feed stock may be provided as a liquid, for example an epoxy with beads of catalyst suspended in a liquid polymer, that is held in the hopper 250. In certain embodiments, passage of the liquid feed stock through an extrusion passage, similar to extrusion passage 133 of embodiment 100, may modify the liquid feed stock such that it hardens quickly after extrusion from the 3D drawing device 200.

The disclosed examples of a 3D drawing device illustrate the principles of its construction and use. The provision of a flow of cooling air at the tip to quickly solidify the extruded feed stock allows the user to work in three dimensions, rather than being forced to rely on a support surface to hold the still-fluid extruded material in place while it hardens. The use of a mechanical gear train to advance the feed stock, instead of a pressurized supply or a direct connection between a trigger and a feed rod, allows precise control of the rate of extrusion, thereby increasing the uniformity of the extruded column of material and allowing precise placement without excess material.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but is to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A three-dimensional (3D) drawing device comprising:
a housing configured to fit in a user's hand and shaped to allow manipulation of the housing like a pen, the housing having a first end and a second end and being configured for introduction of a strand of feed stock through the second end and into an internal volume of the housing;
a nozzle assembly at the first end of the housing and at least partially disposed within the housing and having an exit nozzle;
a motor disposed within the housing;
a gear train disposed within the housing and operatively coupled between the motor and the strand;
first and second buttons disposed on an outer surface of the housing between the first end and the second end;
a circuit assembly operatively connected to the motor and to the first and second buttons, the motor configured to run in a first direction in response to a signal from the circuit assembly when the first or second button is pressed, and the motor configured to temporarily run in a second direction, opposite the first direction, upon release of the first or second button in response to another signal from the circuit assembly; and
a variable speed control mechanism operatively connected to the motor and any of the first and second buttons to adjust a rate of extrusion of the strand out of the exit nozzle.

2. The 3D drawing device of claim 1, wherein the circuit assembly is configured to control the motor to rotate in the first direction at a first rate in response to operation of the first button such that the gear train urges the strand out of the exit nozzle at a first rate, and the circuit assembly is configured to control the motor to rotate in the first direction at a second rate in response to operation of the second button such that the gear train urges the strand out of the exit nozzle at a second rate.

3. The 3D drawing device of claim 1, wherein the circuit assembly is configured to control the motor to rotate in the second direction in response to simultaneous actuation of the first and second buttons.

4. The 3D drawing device of claim 1, wherein the first button and the second button are axially aligned.

5. The 3D drawing device of claim 1, wherein the first button or the second button is configured to selectably cause the motor to rotate in at least the first direction that causes the strand to be extruded out of the exit nozzle.

6. The 3D drawing device of claim 1, wherein the first button or the second button is configured to selectably cause the motor to rotate in the second direction.

7. The 3D drawing device of claim 1, wherein, when the motor runs in the first direction, the strand is advanced toward the nozzle assembly, and when the motor runs in the second direction, the strand is retracted from the nozzle assembly for severing a portion of the strand that has been melted from a portion of the strand that has been extruded.

8. The 3D drawing device of claim 1, wherein the nozzle assembly further comprises an extruder and a guide tube extending between the gear train and the extruder, a first end of the guide tube positioned to receive the strand from the gear train, a second end of the guide tube aligned with a chamber of the extruder such that the strand is directed into the chamber, the extruder being disposed between the guide tube and the exit nozzle.

9. The 3D drawing device of claim 1, wherein the housing comprises first and second portions, at least one of the first or second portions comprising a cooling port.

10. The 3D drawing device of claim 9, wherein each of the first and second portions comprises the cooling port.

11. The 3D drawing device of claim 1, further comprising a fan disposed within the housing and configured to provide a flow of cooling air toward the exit nozzle.

12. A three-dimensional (3D) drawing device comprising:
a housing configured to fit in a user's hand and shaped to allow manipulation of the housing like a pen, the housing having an internal volume and a port that permits insertion of a strand of material into the internal volume;

a gear train disposed within the internal volume to receive and move the strand when engaged with the gear train;

a motor, disposed within the internal volume, operatively coupled with the gear train to drive motion of the strand;

a nozzle assembly disposed at a distal end of the housing for melting and extruding the strand out of an exit nozzle; and a circuit assembly operatively connected to the motor and to first and second buttons, the first and second buttons coupled to the housing to actuate the motor to control a movement of the strand, the first and second buttons being configured to advance or retract the strand relative to the nozzle assembly, the motor configured to run in a first direction in response to a signal from the circuit assembly when the first or second button is pressed, and the motor configured to temporarily run in a second direction, opposite the first direction, upon release of the first or second button in response to another signal from the circuit assembly.

13. The 3D drawing device of claim 12, further comprising a guide tube disposed within the housing and extending between the gear train and the exit nozzle, a first end of the guide tube positioned to receive the strand from the gear train, a second end of the guide tube aligned with a chamber of the extruder such that the strand is directed into the chamber.

14. The 3D drawing device of claim 12, wherein the housing comprises at least one cooling port.

15. The 3D drawing device of claim 12, wherein the housing comprises first and second portions, at least one of the first or second portions comprising a cooling port.

16. The 3D drawing device of claim 12, wherein the circuit assembly is configured to control the motor to rotate at a first rate in response to operation of the first button such that the gear train urges the strand out of the exit nozzle at a first rate, and the circuit assembly is configured to control the motor to rotate at a second rate in response to operation of the second button such that the gear train urges the strand out of the exit nozzle at a second rate.

17. The 3D drawing device of claim 12, wherein actuation of the first button causes the motor to rotate in the first direction at a first motor rate to extrude the strand of material out of the exit nozzle at a first extrusion rate, and actuation of the second button causes the motor to rotate in the first direction at a second motor rate to extrude the strand out of the exit nozzle at a second extrusion rate that is different than the first extrusion rate.

18. The 3D drawing device of claim 17, wherein simultaneous actuation of the first and second buttons causes the motor to rotate in the second direction.

19. The 3D drawing device of claim 12, wherein, when the motor runs in the first direction, the strand is advanced toward the nozzle assembly, and when the motor runs in the second direction, the strand is retracted from the nozzle assembly for severing a portion of the strand that has been melted from a portion of the strand that has been extruded.

* * * * *